(12) United States Patent
Goetz

(10) Patent No.: US 10,218,189 B2
(45) Date of Patent: Feb. 26, 2019

(54) ELECTRICAL ENERGY STORAGE SYSTEM

(71) Applicant: Dr. Ing. h.c. F. Porsche Aktiengesellschaft, Stuttgart (DE)

(72) Inventor: Stefan Goetz, Forstern (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 41 days.

(21) Appl. No.: 15/302,345

(22) PCT Filed: Apr. 7, 2015

(86) PCT No.: PCT/DE2015/000175
§ 371 (c)(1),
(2) Date: Oct. 6, 2016

(87) PCT Pub. No.: WO2015/154743
PCT Pub. Date: Oct. 15, 2015

(65) Prior Publication Data
US 2017/0025866 A1    Jan. 26, 2017

(30) Foreign Application Priority Data
Apr. 7, 2014   (DE) .................... 20 2014 002 953 U

(51) Int. Cl.
*H02J 7/00*   (2006.01)
*H02M 1/32*  (2007.01)
(Continued)

(52) U.S. Cl.
CPC .......... *H02J 7/0014* (2013.01); *H02J 7/0068* (2013.01); *H02M 1/32* (2013.01); *H02M 7/483* (2013.01);
(Continued)

(58) Field of Classification Search
CPC ........ H02J 7/0014; H02J 7/0068; H02M 1/32; H02M 7/483; H02M 7/493
(Continued)

(56) References Cited

U.S. PATENT DOCUMENTS 3,581,212 A    5/1971   McMurray
8,089,247 B2*  1/2012   Pellenc ................. H02J 7/0042
                                                    320/112
(Continued)

FOREIGN PATENT DOCUMENTS

CN    102222941 A    10/2011
CN    103563202 A    2/2014
(Continued)

OTHER PUBLICATIONS

Canadian Office Action for Application No. 2944222, dated Jul. 25, 2017, 7 pages.
(Continued)

*Primary Examiner* — M Baye Diao
(74) *Attorney, Agent, or Firm* — RatnerPrestia

(57) ABSTRACT

An apparatus for electrical power supplies and electrical storage systems. While conventional storage systems, for example batteries, offer very limited electrical properties, for example DC voltage with a voltage which is prespecified by the battery design and the state of charge, the apparatus disclosed herein can deliver virtually any desired current and voltage profiles within certain limits, for example a maximum voltage and a maximum current, without the need for a separate power-electronics converter circuit. At the same time, the apparatus can not only output but also receive energy in virtually any desired form and charge its integrated electrical energy stores, for example capacitors, batteries, rechargeable batteries and the like, while maintaining prespecified charging properties, for example specific current
(Continued)

and voltage profiles or power output profiles over time (for example constant, increasing with a specific profile or falling with a specific profile).

11 Claims, 10 Drawing Sheets

(51) Int. Cl.
*H02M 7/483* (2007.01)
*H02M 7/493* (2007.01)

(52) U.S. Cl.
CPC .... *H02M 7/493* (2013.01); *H02M 2007/4835* (2013.01)

(58) Field of Classification Search
USPC .......................................... 320/118, 116, 103
See application file for complete search history.

(56) References Cited

U.S. PATENT DOCUMENTS

| | | | |
|---|---|---|---|
| 8,278,878 B2 * | 10/2012 | Ishikawa | G01R 19/10 320/116 |
| 8,384,352 B2 | 2/2013 | Shiu et al. | |
| 8,742,631 B2 * | 6/2014 | Phichej | H02P 1/18 307/151 |
| 8,760,122 B2 | 6/2014 | Demetnades | |
| 2011/0248675 A1 * | 10/2011 | Shiu | H01M 10/4207 320/118 |
| 2014/0028266 A1 | 1/2014 | Demetriades | |

FOREIGN PATENT DOCUMENTS

| | | |
|---|---|---|
| JP | 2012044839 A | 3/2012 |
| JP | 2013027232 A | 2/2013 |
| WO | 2013054567 A1 | 4/2013 |

OTHER PUBLICATIONS

Notification of Reason for Rejection for Japanese Application No. 2016-561707, dated Aug. 29, 2017, 4 pages.

Chinese Office Action for Chinese Application No. 2015800189340, dated May 15, 2018, 8 pages.

* cited by examiner

US 10,218,189 B2

ELECTRICAL ENERGY STORAGE SYSTEM

CROSS-REFERENCE TO RELATED APPLICATIONS

This application is a U.S. National Phase Patent Application of PCT Application No. PCT/DE2015/000175, filed Apr. 7, 2015, which claims priority to German Patent Application No. 202014002953.9, filed Apr. 7, 2014, each of which is incorporated by reference herein in its entirety.

FIELD OF THE INVENTION

The present invention involves an apparatus for electrical power supplies and electrical energy storage systems. While conventional energy storage systems, for example batteries, provide very limited electrical properties, for example DC voltage having a voltage prescribed by the battery design and the state of charge, the invention is able, within certain limits, for example a maximum voltage and a maximum current, to provide almost any current and voltage profiles, for example of sinusoidal shape, without needing a separate power electronics converter circuit. At the same time, the invention is able not only to deliver but also to accept energy in almost any form and to charge its integrated electrical energy stores, for example capacitors, batteries, storage batteries and the like, while observing prescribed charging properties, for example particular time-based current profiles, voltage profiles or power profiles (for example constant, rising with a particular profile or falling with a particular profile).

BACKGROUND OF THE INVENTION

Existing systems from the prior art, for example the modular multilevel converter M2C (U.S. Pat. No. 7,269,037; DE 101 03 031), the modular multilevel converter M2SPC (WO 2012 072197; DE 10 2010 052934; WO 2012 072168; WO 2012 072197; EP 2011 0179321; DE 2010 1052934; WO 2013 017186; DE 10 2011 108920) and various modifications (for example U.S. Ser. No. 13/990,463; U.S. Ser. No. 14/235,812; DE 10 2010 008978; DE 10 2009 057288; U.S. Pat. No. 3,581,212), can admittedly, in a manner similar to the present invention, dynamically combine single electrical energy stores with one another in order to allow energy delivery or energy acceptance with almost any current and voltage properties on the connections of the system. However, these known solutions require each electrical energy store to be implemented in a separate module. The electrical switches of the electrically interconnected modules allow, via suitable activation, dynamic alteration of the electrical interconnection of the electrical energy stores integrated in the respective modules, for example between electrical series interconnection of the electrical energy stores of different modules, electrically parallel interconnection of the electrical energy stores of different modules or a bypass of the electrical energy stores of at least one module, as a result of which the current is directed around the electrical energy store through suitable activation of the electrical switches that said electrical energy store is not incorporated in the circuit and hence is at least intermittently neither charged nor discharged. Correct operation, each module can contain only one electrical energy store, however. A combination of multiple electrical energy stores in one module cannot correct any inequalities in the individual electrical energy stores that arise as a result of aging processes or as a result of manufacturing tolerances, for example. Further, it is also not possible for different electrical energy stores, for example a battery and a capacitor, to be integrated into one module. The need to provide a separate module for each individual electrical energy store gives rise to high costs on account of the necessary additional electronic components, such as transistors and DC isolating, for example optical, transformers, for example, and requires complicated actuation on account of the high number of electrical switches to be controlled. Further, a high number of measuring detectors, for example for the module voltage and/or the module current, needs to be integrated into the system.

SUMMARY OF THE INVENTION

The present invention corrects this defect by means of a suitable circuit that can be used as a microtopology for M2C, M2SPC and similar circuits.

DETAILED DESCRIPTION OF THE INVENTION

Figure 4:
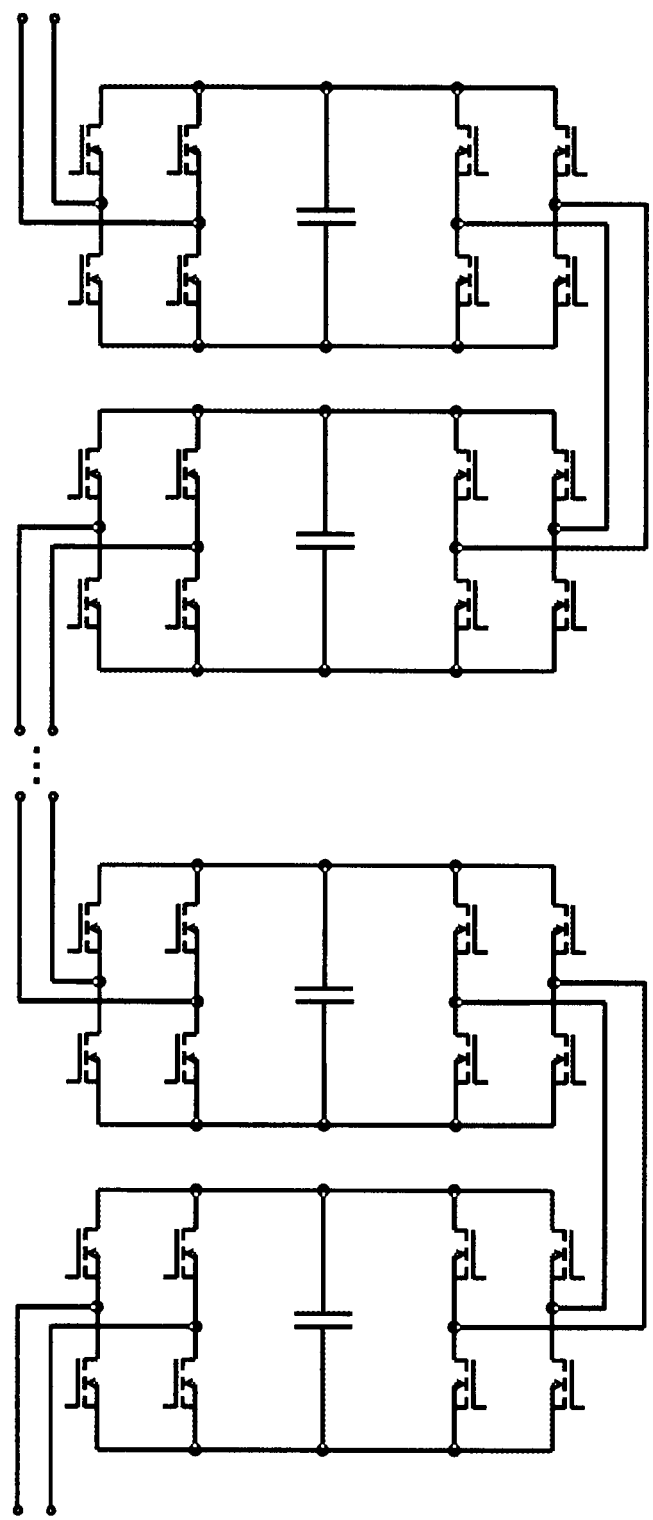
FIG. 4 shows an exemplary interconnection of M2SPC modules to form a converter arm.

The present invention consists of an interconnection of modules whose electrical circuit is described by the "microtopology". These modules are interconnected in the macrotopology to form larger units. Examples of macrotopologies are "Marquardt topology" (see e.g. U.S. Pat. No. 7,269,037 and S. Goetz, A. Peterchev, T. Weyh (2015). Modular Multilevel Converter With Series and Parallel Module Connectivity: Topology and Control. IEEE Transactions on Power Electronics, 30(1):203-215), which is shown for the M2SPC circuit in FIG. 1, or a simple "converter arm", which arises for the interconnection of at least two modules. In this case, modules are normally connected in series such that some of the module connections of one module are electrically conductively connected to some of the module connections of a further module (for example see FIG. 4). Without restricting the concept, FIG. 4 shows a macrotopology in which modules are connected by means of their module connections to form a chain; consequently, each module apart from the two marginal ones is connected to exactly two other modules. While said macrotopology is capable of generating any voltage forms between the ends of the chain, it is also possible for any other macrotopologies to be produced by means of suitable electrical connection of module connections. An advantageous macrotopology is one in which all possible pairs of two modules are either electrically connected to one another directly or are each electrically connected to the same set of modules and hence indirectly. In one macrotopology, it is also possible for different module types, that is to say modules of different microtopologies, to be combined. However, the combined modules should have at least two common states. The state of the modules determines how the associated electrical energy stores or electrical energy storage units of different modules are electrically connected to one another by means of suitable activation of the associated electrical switches of the modules.

The electrical interconnection of multiple electrical energy stores or electrical energy storage units by means of suitable activation of the electrical switches in the associated modules in electrical series, electrical parallel, electrical bypass or the like is referred to as connectivity. The use of fast electrical switches allows the connectivity to be altered dynamically very quickly. Preferably, a dynamic change of connectivity can take place in less than one millisecond, and the invention is particularly advantageous if a dynamic change of connectivity takes place in less than 5 µs.

In the text that follows, the term electrical energy store is also meant to cover electrical energy storage units.

Figure 1:
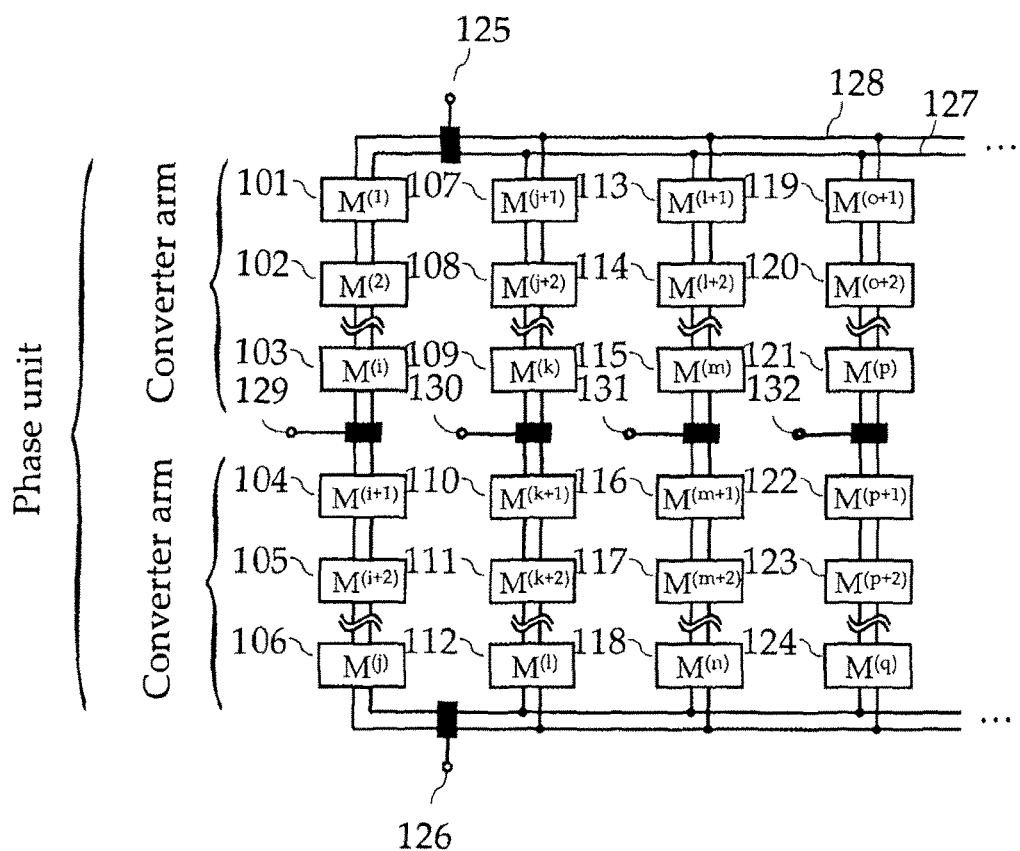
FIG. 1 shows a macrotopology for the M2SPC from the prior art. The macrotopology of the M2SPC describes the interconnection of individual modules that are in turn defined by the microtopology.

The change of connectivity for multiple electrically interconnected modules, for example in a Marquardt topology (see FIG. 1), or for a simple path (often referred to as converter arm, in which connections for external electrical systems such as loads, sources or electrical networks are usually present at the two ends of the path) allows the voltage of the connections (in FIG. 1 (125, 126, 129, 130, 131, 132)) to be dynamically adjusted as desired. The voltage can be adjusted in stages that correspond to the module voltages, that is to say to the voltage provided by the electrical energy stores of the modules; further, rapid changing between multiple such stages also allows the production of fine intermediate levels in the voltage of the connections.

As has already been set out, the system can interchange charge between the electrical energy storage units of different modules, for example in order to allow charge equalization, energy conversion or energy transformation and a particular load distribution within all electrical energy storage units and/or electrical energy stores. The invention further provides the option of dynamic reconfiguration of the electrical energy storage units and/or electrical energy stores into a mixture of series interconnection and, depending on the microtopology used, into a parallel interconnection. Owing to the relatively high internal resistances of many electrical energy stores and the limited dynamics thereof, the parallel state is a particularly advantageous property for the distribution of an electrical load over multiple modules or electrical energy stores and for equalization of the state of charge of multiple individual cells in order to increase the overall efficiency of the system.

A parallel state, consequently a possible parallel connectivity between the electrical energy stores and/or electrical energy storage units, can further have two advantages. It increases the current-carrying capability of the system by reducing effective internal resistance. Additionally, the parallel state provides a method for equalizing the charge of individual modules without the need to measure and monitor electrical parameters such as the module voltage, for example. Since the invention requires no precise information about the inward and outward flow of charge in the modules, it can provide an equalized state of the system even without a closed control loop in an open loop controller and can simplify charge monitoring throughout the system, for example.

Under certain conditions, it is advantageous for more than one electrical energy store to be integrated into a single module. Advantageously, these multiple electrical energy stores can be electrically connected in series in order to generate a common higher voltage than a single electrical energy store. Further, it may be advantageous if the individual electrical energy stores combined in one module in this case are not of the same type or differ from one another at least slightly in terms of their operating behavior or their properties (voltage, capacitance, compatible maximum voltage, temperature). This slight difference already exists by virtue of at least a 5% difference in the individual electrical energy stores combined in one module in one of the cited parameters from one another.

Figure 2:
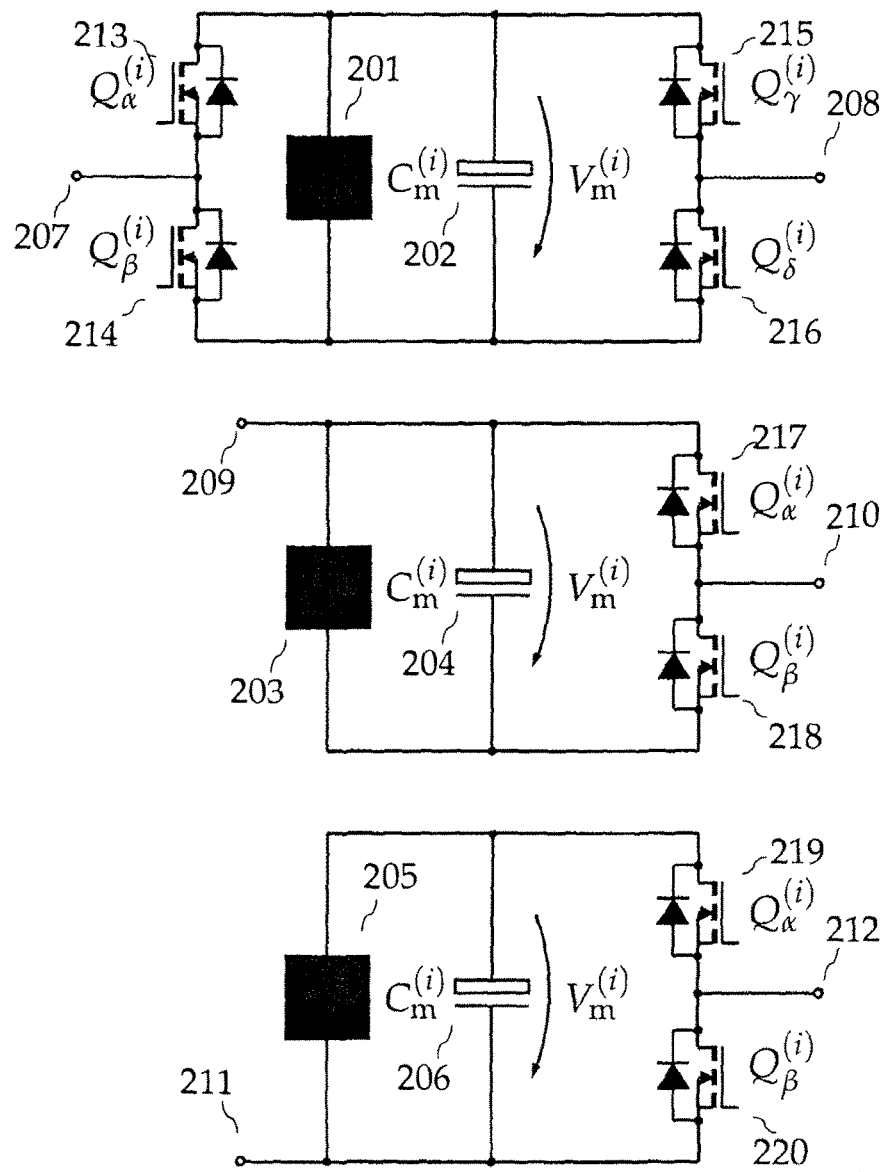
FIG. 2 shows three exemplary microtopologies, consequently module topologies for the M2C technology from the prior art. Electrical energy stores or module stores (202, 204, 206) are connected up to two module terminals (207, 208), (209, 210) and (211, 212) into a by electronic switches such that the module store (202, 204, 206) can be in electrically conductively connected in multiple states to the two module terminals (207, 208), (209, 210) and (211, 212) in different ways. All three modules shown have at least a bypass state and a series state. In the bypass state, the current is directed past the electrical module store (202, 204, 206) by electrical switches from one module terminal (207, 209, 211) to the second (208, 210, 212) such that only no more than one of the two connections of the electrical module store is electrically conductively connected to any of the module terminals, while the other connection of the electrical module store (202, 204, 206) is isolated from the module terminals by the electrical switches, so that the electrical module store does not participate in a circuit with the module terminals and is neither discharged nor charged. In a series state, one of the two connections of the electrical module store (202, 204, 206) is electrically conductively connected to one of the two module terminals (207, 208), (209, 210) and (211, 212) by the electrical switches; further, the other of the two connections of the electrical module store (202, 204, 206) is electrically conductively connected to the other of the two module terminals (207, 208), (209, 210) and (211, 212). As a result, in the series state, the electrical module store is electrically conductively connected between the two module terminals and is either charged or discharged by the flowing current. In this case, the voltage between the two module terminals corresponds to the voltage of the electrical module store. Besides the electrical module store, the modules can contain further electrical elements, as indicated in the present case by black boxes (201, 202, 203).
Figure 3:
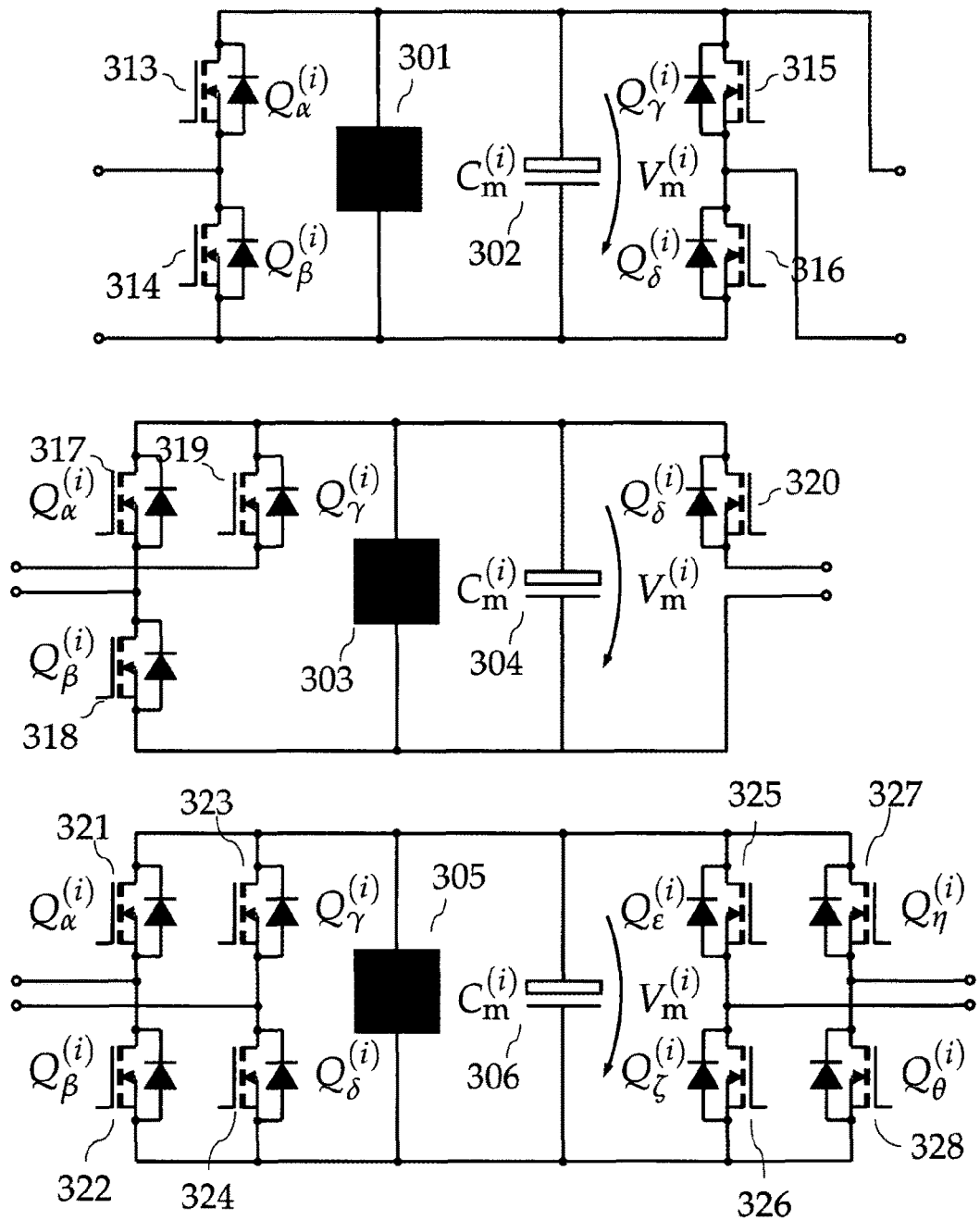
FIG. 3 shows three exemplary microtopologies for the M2SPC technology. These modules further have, besides the states already cited, at least one parallel state that allows the electrical module stores of two different modules to be connected to one another in electrical parallel with suitable activation of the electrical switches of the modules.
Figure 5:
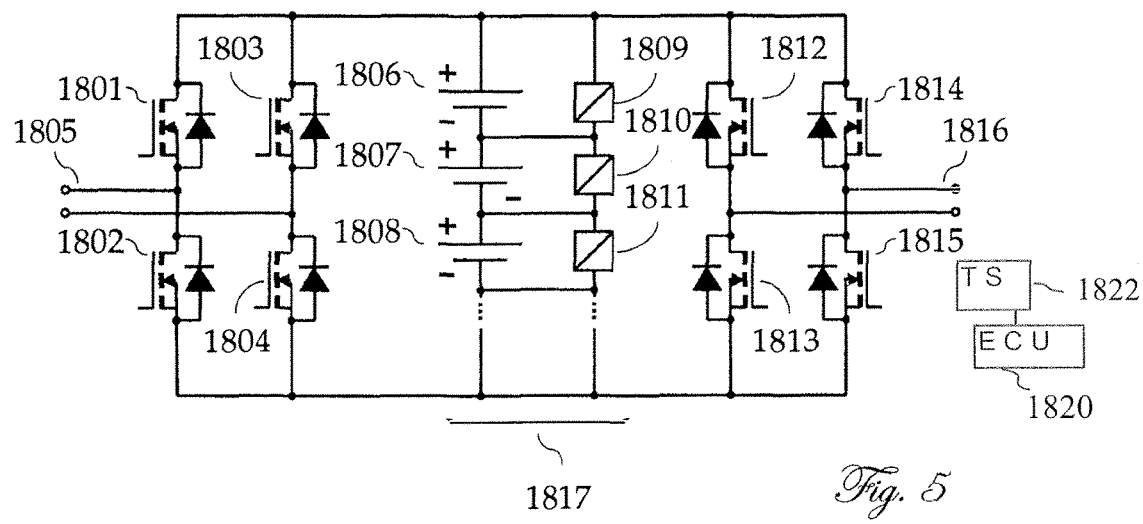
FIG. 5 shows an embodiment of the invention. By way of example, one of the M2SPC modules from FIG. 3 has been chosen as initial basis. In the present case, the electrical energy store (302) is replaced by an electrical storage unit (1817) that consists of at least two individual stores (1806, 1807, 1808) and associated correction elements (1809, 1810, 1811). The electrical storage unit (1817) can be integrated into other module topologies, such as those from U.S. Pat. No. 7,269,037; DE 101 03 031; WO 2012 072197; DE 10 2010 052934; WO 2012 072168; WO 2012 072197; EP 2011 0179321; DE 2010 1052934; WO 2013 017186; DE 10 2011 108920; U.S. Ser. No. 13/990,463; U.S. Ser. No. 14/235,812; DE 10 2010 008978; DE 10 2009 057288; U.S. Pat. No. 3,581,212, for example.

Advantageously, there is a slight difference for a 10% difference in the individual electrical energy stores combined in one module in one of the cited parameters. In comparison with solutions from the prior art, the present invention saves components and also modules, simplifies control and reduces losses that arise with a large number of individual modules in the actuation of the modules and the DC isolated transmission of signals from and to the modules. FIG. 5 shows an exemplary module according to the invention. Said module contains multiple electrical energy stores (1806, 1807, 1808) that are each electrically connected in parallel with an associated correction element (1809, 1810, 1811). Multiple paired units comprising electrical energy stores and associated correction element are electrically connected in series and form an electrical storage unit (1817). In an electrical energy storage unit (1817) the individual electrical energy stores do not have to be connected exclusively in series. Each individual electrical energy store can also be boosted by further electrical energy stores that are electrically connected in parallel with the former. As already set out, the electrical energy storage unit (1817) can also be combined with other microtopologies, for example those from FIGS. 2 and 3, in accordance with the invention. In this case, the electrical energy storage unit replaces or augments the electrical energy store, for example (202, 204, 206, 302, 304, 306), in the microtopology.

Further, it is also possible for multiple similar or different electrical energy storage units to be electrically connected in parallel or electrically connected in series with one another and then integrated into a module. The resultant combination of electrical energy storage units is in turn an electrical energy storage unit within the context of the invention.

A typical demand on a correction element is the dissipation of charge, also called drawing off, from electrical energy stores connected in parallel therewith in order to reduce voltage stress on an electrical energy store by keeping the peak voltages that arise via each of the connections of the electrical energy store below a prescribed limit, for example, and/or in order to limit the electrical load on an electrical energy store and/or to limit the temperature of an electrical energy store. Control or regulation of a correction element can be accomplished by a separate electronic control unit that delivers the signal for one or more electrical switches in the correction element and/or controllable impedances in the correction element; further, the control or regulation of a correction element can also take place passively, that is to say that a separate electrical control unit is not needed, but rather that physical or chemical properties of one or more elements of the correction element, for example a particular temperature or voltage dependency of a resistance, an impedance or a semiconductor, results in control or regulation of the correction element.

Figure 6:
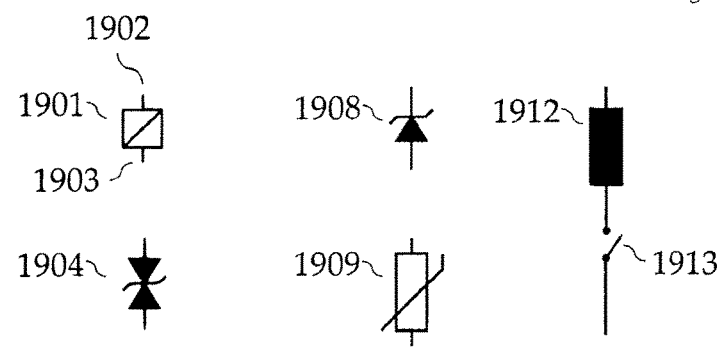
FIG. 6 shows implementations of the correction elements (1809, 1810, 1811, 1901). A correction unit contains at least two electrical connections (1902, 1903) and allows controlled flow of current where particular conditions are satisfied.
Figure 6:
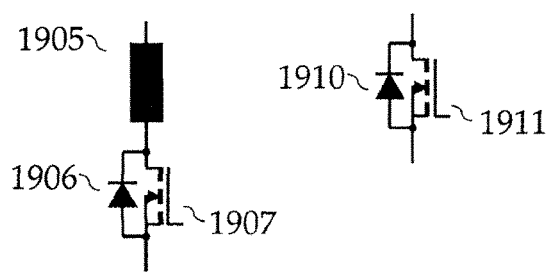
Figure 7:
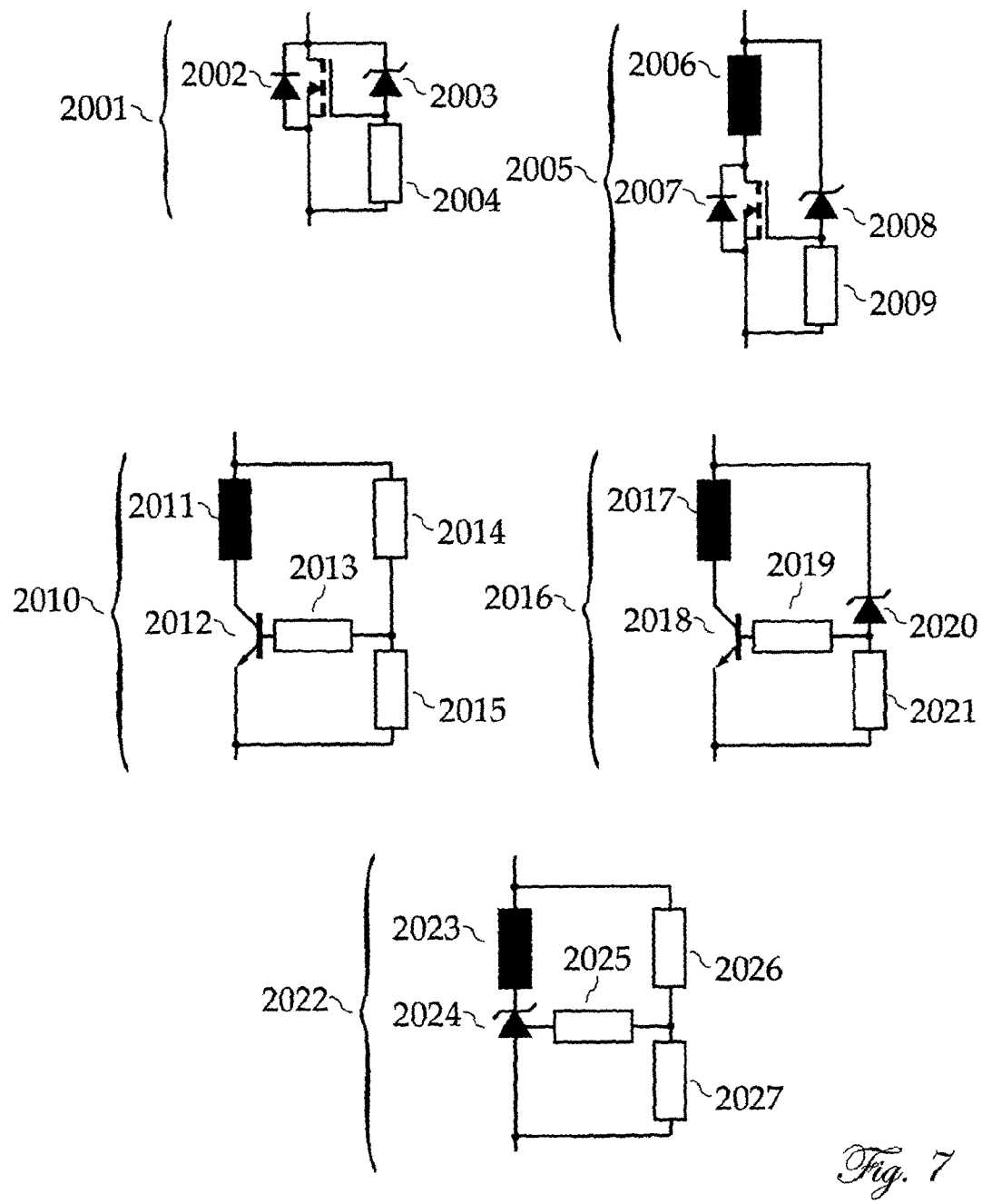
FIG. 7 shows further implementations for correction elements (1809, 1810, 1811, 1901, 2001, 2005, 2010, 2016, 2022).

By way of example, the correction elements (1809, 1810, 1811) can be implemented as shown in FIGS. 6 and 7. Correction elements may be electrical two-pole networks having electrical connections (1902) and (1903). For a voltage limiting with simultaneous charge removal, it is possible for the following electrical elements to be used, for example:

(a) zener diodes (1908) and electrically similar elements having a low resistance for voltages above a particular limit;

(b) suppressor diodes (1904);

(c) voltage-dependent (usually nonlinearly) complex impedances (i.e. having a resistive and/or reactive component(s)) (1905);

(d) arrestors (1909) or other voltage- or temperature-dependent impedances that can contain resistive and/or reactive components;

(e) electrical switches or controllable impedances (Inter alia relays, field effect transistors, bipolar transistors and other controllable resistors) (1911);

(f) electrical switches or controllable impedances combined with complex impedances (1912, 1913) that can have resistive and/or reactive components and be nonlinear.

Examples of controllable impedances are electrical switches and semiconductor elements that can be operated not as switches (i.e. with just two states: a closed state with good electrical conductivity [less than 1Ω effective resistance, advantageously less than 0.1Ω effective resistance] and an open state with poor electrical conductivity [greater than 1000Ω effective resistance; advantageously at least 1 000 000Ω effective resistance]) but rather in the resistance range thereof in between, or switches that change over between multiple resistances or impedances, and controllable zener diodes (what are known as adjustable zener diodes).

For solutions that include an electrical switch or controllable impedance (1911, 1912/1913), a control unit can provide a control signal and/or perform closed loop control or open loop control.

Passive solutions, i.e. particularly solutions that do not require a separate measuring, monitoring and/or control unit, have important advantages, reduce costs and limit complexity. FIG. 7 shows some embodiments that implement switches or controllable impedances together with means that control them and, by way of example, can limit the voltage of one or more particular energy stores as part of an energy storage unit. A voltage limiting system (2001) can be implemented as a switch or controllable impedance, shown in the present case as field effect transistor (2002), resistor (2004) and a zener diode (alternatively also voltage suppressor, arrestor or the like) (2003). The gate voltage of the transistor is controlled by a voltage $V_s$ that is lower by a particular voltage level, which is stipulated by the element (2003), than the voltage of the energy store associated with the correction element. Suitable selection of the threshold voltage $V_t$ of the transistor and of the breakdown voltage of the element (2003) $V_s$ allows the maximum voltage of the energy store to be limited to approximately $V_t+V_s$. A freewheeling diode reverse connected in parallel with the switch or controllable impedance (2002) can prevent voltage spikes on account of reactive currents.

Element (2003) can likewise be replaced by a traditional resistor. Further, an impedance (2006) can be inserted into the current path of the electrical switch or of the controllable impedance (2007), as shown in (2005). In (2010) and (2016), the electrical switch or the controllable impedance is embodied as a bipolar transistor (2012, 2018); in (2022), the electrical switch or the controllable impedance is embodied as a controllable zener diode (also referred to as adjustable zener diode) (2024) that allows changes to its breakdown voltage through at least one control input and is supplied commercially by multiple manufacturers.

The impedances (2006, 2011, 2017, 2023) are optional and may be close or equal to zero. Similarly, gate, base and similar input resistances (2013, 2019, 2025) may be close or equal to zero.

Figure 8:
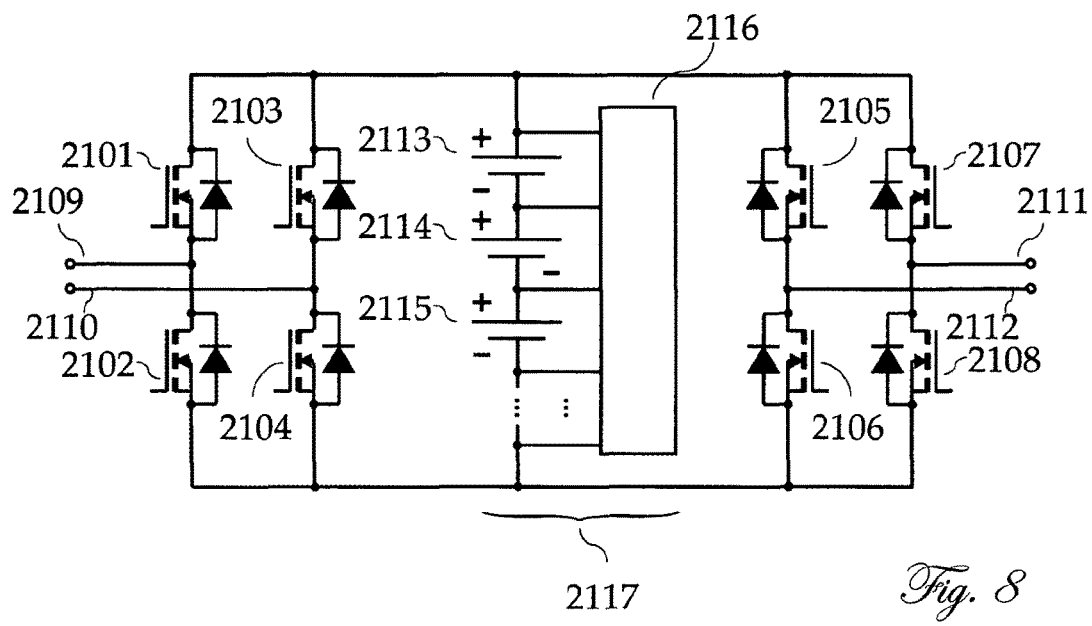
FIG. 8 shows a particular embodiment of the invention with at least one correction unit (2116) that comprises at two correction elements.
Figure 9:
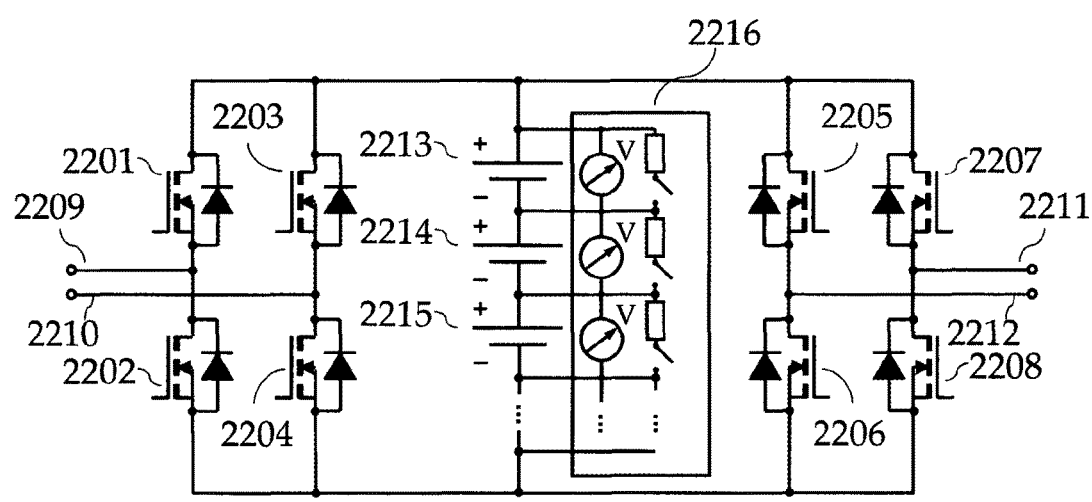
FIG. 9 shows a further particular embodiment of the invention with at least one correction unit (2216) that comprises at least two correction elements and at least two voltage sensors, wherein at least two of the correction elements are connected in electrical parallel with respective different electrical energy stores.

The correction elements of at least two electrical energy stores (2113, 2114, 2115; 2213, 2214, 2215) of the same module, which each comprise at least one transistor, for example, and preferably further each comprise at least one impedance, can together form a correction unit (2116; 2216) (for example see FIGS. 8 and 9). Preferably, a correction unit further comprises at least two voltage sensors (see FIG. 9). Such a voltage sensor can measure both the voltage of a single electrical energy store and an electrical combination, for example in series or parallel, of multiple electrical energy stores. The at least two voltage sensors can further also be embodied as a single voltage sensor with a multiplexer. Such a combination of multiplexer and sensor is interpreted as multiple sensors within the context of this invention on account of similar behavior. In a particular embodiment of the invention, at least two electrical energy stores of at least two modules each have at least one respective correction unit and at least one respective voltage sensor electrically connected in parallel with them. In another embodiment of the invention, a correction unit comprises at least one current sensor that measures the current that flows into or out of at least one electrical energy store of the associated module.

Figure 10:
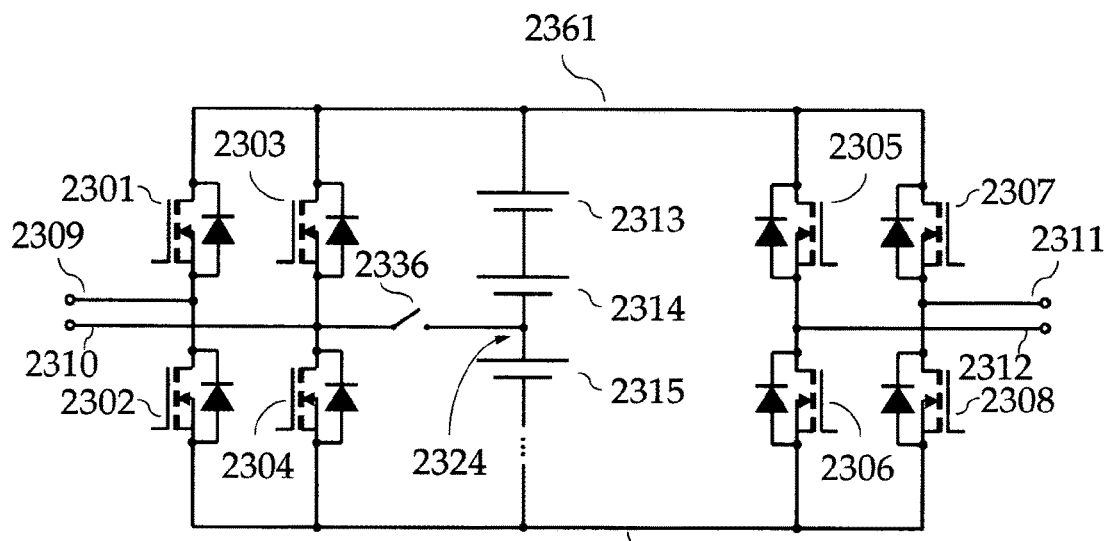
FIG. 10 shows a module of a particular embodiment of the invention with an alternative correction unit (2336).

As FIG. 10 shows, a correction element may alternatively comprise an electrical switch (2336) that, on activation, electrically conductively connects a connecting node (2324) for at least two electrical energy stores (2314, 2315) to a module terminal (2310). In its way, it is possible for the electrical energy stores between said connecting node (2324) and the positive module busbar (2361) and the electrical energy stores between said connecting node (2324) and the negative module busbar (2362) to be discharged or charged to different degrees by virtue of the current that flows through the module terminal(s), which current comes from another module or an electrical load, for example, being directed to or removed from said connecting node (2324) in part or fully via the electrical switch (2336). This allows equalization of different states of charge and physical and/or chemical differences—likewise cited at the outset—in the electrical energy stores integrated into a module.

Figure 11:
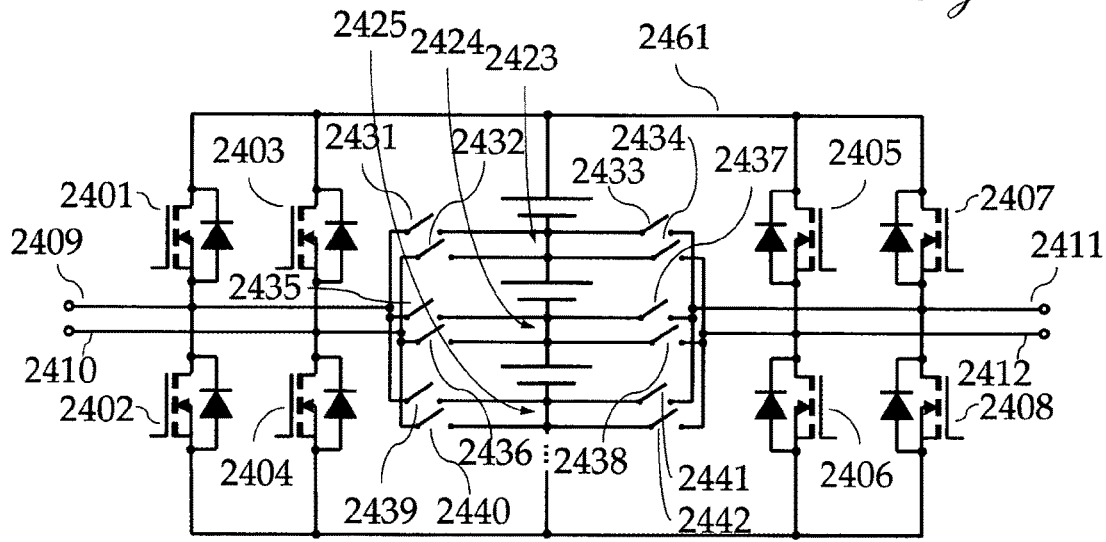
FIG. 11 shows a module of a particular embodiment of the invention with alternative correction units (2431-2442) that provides maximum flexibility.
Figure 12:
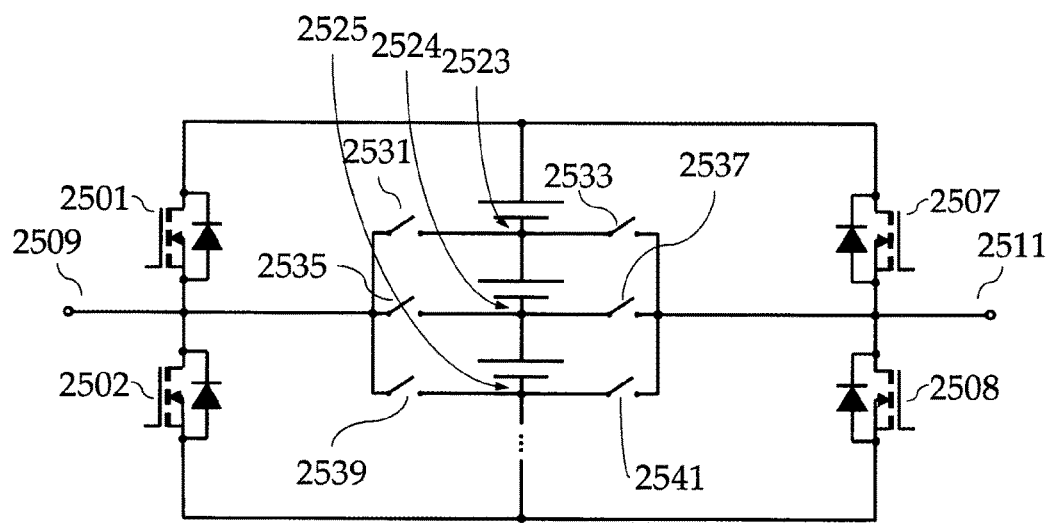
FIG. 12 shows a module of a further particular embodiment of the invention.

As shown in FIG. 11 as an example of a module having four module terminals (2409, 2410, 2411, 2412), the correction elements may be embodied such that each connecting node (2423, 2424, 2425) of at least two electrical energy stores that is not directly identical to a positive module busbar (2461) or negative module busbar (2462) is at least intermittently electrically conductively connected to each of the module terminals (2409-2412) via at least one respective electrical switch (2431-2442). A module having just two module terminals (2509, 2511) for this situation accordingly requires a smaller number of electrical switches (2531, 2533, 2535, 2537, 2539, 2541), as shown in FIG. 12, the number rising accordingly for a higher number of module terminals, as a person skilled in the art can see. The inventor has further recognized that although the provision of the respective dedicated electrical switch between each connecting node of at least two electrical energy stores that does not simultaneously correspond to a busbar and each module terminal affords extensive flexibility, it is not necessary in order to ensure independent charging and discharge of the electrical energy stores of a module. For the variants described above, which provide extensive switchable electrical connections from connecting nodes to module terminals, it is in some cases possible to save more than half of all electrical switches.

Preference is given to embodiments in which it is possible for each connecting node for a least two electrical energy stores that does not simultaneously correspond to a busbar—which itself can already be at least intermittently electrically conductively connected to a module terminal via an electrical switch—to be at least intermittently electrically conductively connected to at least one arbitrary module terminal via at least one electrical switch.

In order to avoid a high number of switches, it is also possible for just some of the connecting nodes for at least two electrical energy stores to be electrically conductive connected to at least one module terminal via electrical switches.

Figure 13:
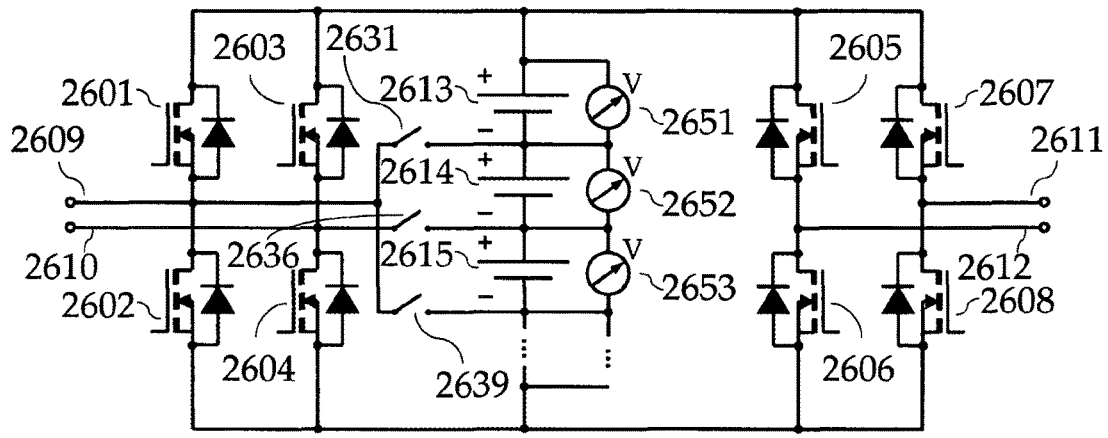
FIG. 13 shows a module of a particular embodiment of the invention with a reduced number of alternative correction units (2631, 2636, 2639).

FIG. 13 shows a randomly chosen embodiment in which at least three, preferably every, connecting node(s) for at least two electrical energy stores (2613, 2614, 2615) can be at least intermittently electrically conductively connected to at least one module terminal (2609, 2610) via at least one electrical switch (2631, 2636, 2639). In FIG. 13, the electrical switches connect two of the three connecting nodes shown to different module terminals (2609, 2610) by way of example in order to illustrate the flexibility with regard to possible combinations. Further, at least one electrical energy store (2613, 2614, 2615) can have at least one respective voltage sensor (2651, 2652, 2653). Preferably, at least one voltage sensor is electrically connected in parallel with each electrical energy store of a module. Such a voltage sensor can measure both the voltage of a single electrical energy store and an electrical combination, for example in series or parallel, of multiple electrical energy stores. Since only very small equalization currents need to flow via said electrical switches between the connecting nodes for at least two electrical energy stores and at least one module terminal, the electrical switches can be embodied very inexpensively. As switching speed rises and there is the associated fast equalization of uneven discharge or charging of electrical energy stores, the current carrying capability of said electrical switches can be reduced further. The necessary dielectric strength of said electrical switches is lower than the module voltage, depending on the location of the connection of the switch to a connecting node for at least two electrical energy stores. By way of example, the highest voltage that an electrical switch between the middle connecting node from an electrically serial interconnection of four electrical energy stores having the same voltage and a module terminal is just approximately half the module voltage.

Figure 14:
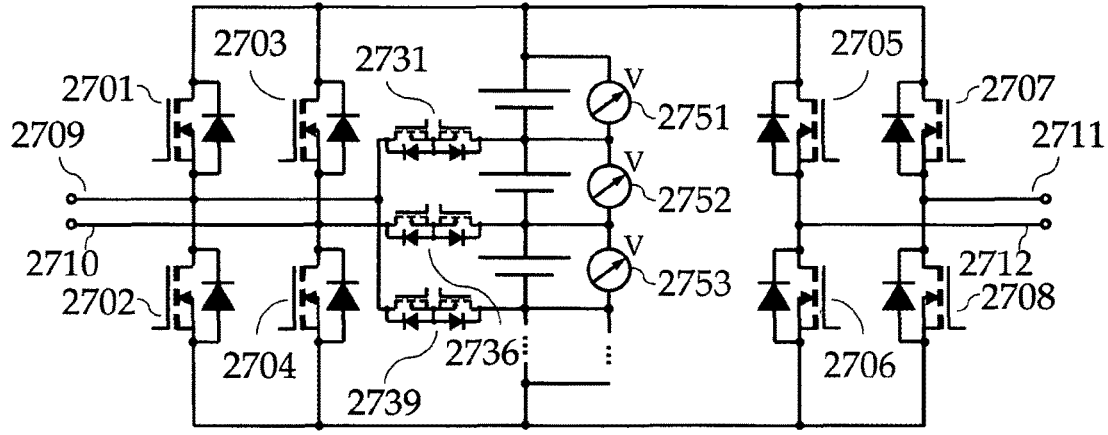
FIG. 14 shows a module of a particular embodiment of the invention with bidirectional electrical switches.

The electrical switches between connecting nodes for at least two electrical energy stores and module terminals may be embodied as mechanical electrical switches. Preferably, said switches are semiconductor switches that allow not only simple activation and deactivation of the electrical line but also switching modulation, for example pulse width modulation (PWM), in order to regulate voltage or flow of current and hence, despite high load currents on the module terminals, a small equalization current in order to equalize different charging or discharge of the electrical energy stores. Particularly semiconductor switches can be implemented either as switches that switch current only unidirectionally or as switches that can also switch current bidirectionally. FIG. 14 shows three electrical switches (2731, 2736, 2739) by way of example that are able to switch current bidirectionally. Bidirectional switches afford the advantage that current can be controlled in both directions and hence both in source mode and in charging mode of the electrical energy stores of the module.

A combination of correction elements that comprise electrical switches that can intermittently electrically conductively connect connecting nodes for at least two electrical energy stores and at least one module terminal (see FIGS. 10-14) and correction elements that are arranged in parallel with individual electrical energy stores or with a, for example serial or parallel, combination of multiple electrical energy stores (see FIGS. 5-9) are able to have extraordinary advantages. By way of example, the former correction elements are capable of charging individual electrical energy stores to a greater extent than others, but can generate higher production costs depending on the components used, while the latter correction elements can primarily force a discharge and are manufacturable inexpensively at present. A combination can combine the advantages of both.

One embodiment of the invention includes multiple electrically interconnected modules (101-124) of similar type that each have at least one electrical energy store (202, 204, 206, 302, 304, 306) or at least one electrical energy storage unit (1817) and at least one electrical switch (213-317, 318-328; 1801, 1802, 1803, 1804, 1812, 1813, 1814, 1815), constituted such that at least one module (101-124) has an electrical energy storage unit (1817) that has at least two electrically series-connected electrical energy stores (1806, 1807, 1808), wherein each of these electrical energy stores (1806, 1807, 1808) has an electrically parallel-connected correction element (1809, 1810, 1811) that is capable of drawing off and/or directing in electrical charge from/into the respective electrically parallel-connected electrical energy store (1806, 1807, 1808), wherein the multiple modules are deemed of similar type if they are able to represent at least two of the following three states by means of suitable activation of the respective at least one electrical switch (213-317, 318-328; 1801, 1802, 1803, 1804, 1812, 1813, 1814, 1815):

the at least one electrical energy store (202, 204, 206, 302, 304, 306) or the at least one electrical energy storage unit (1817) of a module is connected in series with the at least one electrical energy store (202, 204, 206, 302, 304, 306) or the at least one electrical energy storage unit (1817) of a further module;

the at least one electrical energy store (202, 204, 206, 302, 304, 306) or the at least one electrical energy storage unit (1817) of a module is connected in parallel with the at least one electrical energy store (202, 204, 206, 302, 304, 306) or the at least one electrical energy storage unit (1817) of a further module;

the at least one electrical energy store (202, 204, 206, 302, 304, 306) or the at least one electrical energy storage unit (1817) of a module is bypassed such that the at least one electrical energy store (202, 204, 206, 302, 304, 306) or the at least one electrical energy storage unit (1817) of a module has only no more than one of its at least two electrical contacts electrically conductively connected to at least one electrical energy store (202, 204, 206, 302, 304, 306) or at least one electrical energy storage unit (1817) of a further module and there is no completed circuit with at least one electrical energy store (202, 204, 206, 302, 304, 306) or at least one electrical energy storage unit (1817) of a further module. An alternative embodiment of the invention includes multiple electrically interconnected modules (101-124) of similar type that each comprise at least on electrical energy store (202, 204, 206, 302, 304, 306) or at least one electrical energy storage unit (1817) and at least two electrical switches (213-317, 318-328; 1801, 1802, 1803, 1804, 1812, 1813, 1814, 1815) that allow the connectivity of the at least one electrical energy store (202, 204, 206, 302, 304, 306) or of the at least one energy storage unit (1817) in relation to energy stores (202, 204, 206, 302, 304, 306) or energy storage units (1817) of other modules to be changed, constituted such that at least one module (101-124) comprises an electrical energy storage unit (1817) that comprises at least two electrically series-connected electrical energy stores (1806, 1807, 1808), wherein each of these electrical energy stores (1806, 1807, 1808) has a correction element (1809, 1810, 1811; 2336; 2431-2442; 2531, 2535, 2539; 2631, 2636, 2639) that is capable of drawing off electrical charge from the electrical energy storage unit (1817), and/or of directing electrical charge into the electrical energy storage unit (1817), such that some of the electrical energy stores of the electrical energy storage unit (1817) are burdened with a smaller current than the other electrical energy store energy storage unit (1817), wherein the multiple modules are deemed of similar type if they are able represent at least the following switching states by means of suitable activation of the respective at least two electrical switches (213-317, 318-328; 1801, 1802, 1803, 1804, 1812, 1813, 1814, 1815):

the at least one electrical energy store (202, 204, 206, 302, 304, 306) or the at least one electrical energy storage unit (1817) of a module is connected in series with the at least one electrical energy store (202, 204, 206, 302, 304, 306) or the at least one electrical energy storage unit (1817) of a further module;

the at least one electrical energy store (202, 204, 206, 302, 304, 306) or the at least one electrical energy storage unit (1817) of a module is bypassed such that the at least one electrical energy store (202, 204, 206, 302, 304, 306) or the at least one electrical energy storage unit (1817) of a module has only no more than one of its at least two electrical contacts electrically conductively connected to at least one electrical energy store (202, 204, 206, 302, 304, 306) or at least one electrical energy storage unit (1817) of a further module and there is no completed circuit of at least one electrical energy store (202, 204, 206, 302, 304, 306) or at least one electrical energy storage unit (1817) of a further module.

Preferably, at least two modules further additionally allow a switching state in which the at least one electrical energy store (202, 204, 206, 302, 304, 306) or the at least one electrical energy storage unit (1817) of a module is connected in parallel with the at least one electrical energy store (202, 204, 206, 302, 304, 306) or the at least one electrical energy storage unit (1817) of a further module.

In a preferred embodiment, at least one correction element (1809, 1810, 1811) is embodied in electrical parallel with at least one electrical energy store (1806, 1807, 1808).

In a further preferred embodiment, at least one correction element has at least one electrical switch that can intermittently electrically conductively connect at least one connecting node for at least two electrical energy stores to at least one module terminal.

In a further preferred embodiment, at least one of the correction elements (1809, 1810, 1811) limits the voltage of the at least one energy store (1806, 1807, 1808) connected in electrical parallel therewith to a prescribed range. For said limiting of the voltage, the invention can comprise a voltage- and/or temperature-dependent impedance, for example.

In a further preferred embodiment, at least one of the correction elements has at least one electrically controllable element (1907, 1911, 1913, 2002, 2007, 2011, 2018, 2024) and at least one impedance (1905, 1912, 2006, 2011, 2017), wherein the at least one electrically controllable element (1907, 1911, 1913, 2002, 2007, 2011, 2018, 2024) is embodied as an electrical switch having at least two states, one with good electrical conductivity and one with poor electrical conductivity.

In a particularly preferred embodiment, the at least one electrically controllable element (1907, 1911, 1913, 2002, 2007, 2011, 2018, 2024) is embodied as an electrically controllable impedance.

In a further preferred embodiment, the at least one electrically controllable element (1907, 1911, 1913, 2002, 2007, 2011, 2018, 2024) is actuated by an electronic control unit ECU 1820 (FIG. 5).

In an alternative embodiment, the at least one electrically controllable element (1907, 1911, 1913, 2002, 2007, 2011, 2018, 2024) is controlled by a circuit that contains at least one impedance element that alters its impedance on the basis of external physical or chemical effects.

In a particularly preferred embodiment, the at least one impedance element that alters its impedance on the basis of external physical or chemical effects has a voltage-dependent or temperature-dependent impedance.

In a further preferred embodiment, the electronic control unit 1820 that controls or regulates at least one correction element (1809, 1810, 1811) of an electrical energy storage unit (1817) is connected to the at least one output line of at least one voltage sensor that detects the voltage of at least one electrical energy store (1806, 1807, 1808) of the associated electrical energy storage unit (1817).

In a further preferred embodiment, the electronic control unit 1820 that controls or regulates at least one correction element (1809, 1810, 1811) of an electrical energy storage unit (1817) is connected to the at least one output line of at least one temperature sensor TS 1822 that detects the temperature of at least one electrical energy store (1806, 1807, 1808) of the associated electrical energy storage unit (1817). Connection lines between the electronic control unit 1820 and the correction elements are omitted.

The invention claimed is:

1. An electrical circuit that comprises multiple electrically interconnected modules of the same type, each module interconnected with at least one other module by a pair of module terminals, each module having at least one electrical energy store or at least one electrical energy storage unit and at least two electrical switches that allow the connectivity of the at least one electrical energy store or of the at least one energy storage unit in relation to the at least one energy store or energy storage units of other modules to be changed, wherein at least one module of the multiple electrically interconnected modules comprises the at least one electrical energy storage unit that has at least two electrically series-connected electrical energy stores, wherein each of the series-connected electrical energy stores has at least one correction element that is configured to draw off electrical charge from the energy storage unit, or direct electrical charge into the energy storage unit, such that some of the electrical energy stores of the energy storage unit have a smaller electric current flowing through them than the other electrical energy stores of the energy storage unit, wherein each of the multiple electrically interconnected modules are configured to use suitable activation of the respective at least two electrical switches to selectively represent each of at least the following two states:
(1) the at least one electrical energy store or the at least one electrical energy storage unit of a module of the multiple electrically interconnected modules is connected in series with the at least one electrical energy store or the at least one electrical energy storage unit of a further module of the multiple electrically interconnected modules; and
(2) the at least one electrical energy store or the at least one electrical energy storage unit of a module of the multiple electrically interconnected modules is connected in parallel with the at least one electrical energy store or the at least one electrical energy storage unit of a further module of the multiple electrically interconnected modules.

2. The electrical circuit as claimed in claim 1, wherein the at least one correction element is connected in parallel with the at least one electrical energy store.

3. The electrical circuit as claimed in claim 2, wherein at least one of the correction elements limits the voltage of the at least one energy store connected in parallel therewith to a prescribed range.

4. The electrical circuit as claimed in claim 2, wherein at least one of the correction elements has a voltage- or temperature-dependent impedance.

5. The electrical circuit as claimed in claim 2, wherein at least one of the correction elements has at least one electrically controllable element and at least one impedance, wherein the at least one electrically controllable element is embodied as an electrical switch having at least two states, one state of the at least two states having a higher electrical conductivity than the other state of the at least two states.

6. The electrical circuit as claimed in claim 1, wherein at least one of said correction elements has at least one electrical switch that can intermittently electrically connects at least one connecting node for at least two of the electrical energy stores to at least one module terminal.

7. The electrical circuit as claimed in claim 4, wherein the circuit further comprises at least one electronic control unit.

8. The electrical circuit as claimed in claim 7, wherein the at least one electronic control unit actuates the at least one correction element.

9. The electrical circuit as claimed in claim 8, wherein the electrical circuit further comprises at least two voltage sensors that detect the voltage of the electrical energy stores and transmit it to the at least one electronic control unit.

10. The electrical circuit as claimed in claim 7, wherein the electronic control unit, which controls the at least one correction element of the electrical energy storage unit, is connected to at least one output line of at least one temperature sensor that detects a temperature of at least one electrical energy store of the associated electrical energy storage unit.

11. The electrical circuit as claimed in claim 1, wherein each of the multiple electrically interconnected modules are further configured to use suitable activation of the respective at least two electrical switches to also selectively represent the following state:

(3) the at least one electrical energy store or the at least one electrical energy storage unit of a module of the multiple electrically interconnected modules is bypassed such that the at least one electrical energy store or the at least one electrical energy storage unit of said module of the multiple electrically interconnected modules has no more than one of its at least two electrical contacts electrically conductively connected to at least one electrical energy store or at least one electrical energy storage unit of a further module of the multiple electrically interconnected modules and there is no completed circuit with at least one electrical energy store or at least one electrical energy storage unit of the further module.

\* \* \* \* \*